(12) United States Patent
Abe et al.

(10) Patent No.: US 8,657,450 B2
(45) Date of Patent: Feb. 25, 2014

(54) PROJECTION OPTICAL SYSTEM AND IMAGE PROJECTION DEVICE

(75) Inventors: Issei Abe, Kanagawa (JP); Kazuhiro Fujita, Tokyo (JP); Tatsuya Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 273 days.

(21) Appl. No.: 13/184,605

(22) Filed: Jul. 18, 2011

(65) Prior Publication Data

US 2012/0019791 A1 Jan. 26, 2012

(30) Foreign Application Priority Data

Jul. 21, 2010 (JP) .................. 2010-163659

(51) Int. Cl.
*G03B 21/28* (2006.01)
*G02B 9/00* (2006.01)

(52) U.S. Cl.
USPC .................. 353/99; 353/97; 353/70; 353/77; 359/649

(58) Field of Classification Search
USPC ........................ 353/99, 97, 77, 70; 359/649
See application file for complete search history.

(56) References Cited

U.S. PATENT DOCUMENTS

| 2,510,080 | A | 6/1950 | Cuneo |
| 6,951,395 | B2 | 10/2005 | Chatani et al. |
| 6,952,314 | B2 | 10/2005 | Yanagi et al. |
| 6,991,338 | B2 | 1/2006 | Sunaga et al. |
| 7,182,466 | B2 | 2/2007 | Sunaga |
| 7,441,908 | B2 | 10/2008 | Takaura et al. |
| 7,549,755 | B2 | 6/2009 | Suzuki |
| 2006/0092385 | A1 | 5/2006 | Hisada et al. |
| 2006/0227303 | A1 | 10/2006 | Matsubara et al. |
| 2008/0192336 | A1 | 8/2008 | Ohzawa |
| 2008/0212038 | A1 | 9/2008 | Hirata et al. |
| 2009/0115975 | A1 | 5/2009 | Ogura |
| 2009/0122279 | A1* | 5/2009 | Minefuji .................. 353/99 |
| 2009/0213470 | A1* | 8/2009 | Abe et al. .................. 359/649 |

FOREIGN PATENT DOCUMENTS

| JP | 2006-235516 | 9/2006 |
| JP | 4223936 | 2/2009 |
| JP | 2009-116149 | 5/2009 |
| JP | 2009-204846 | 9/2009 |

OTHER PUBLICATIONS

The extended European search report dated Nov. 24, 2011.

* cited by examiner

*Primary Examiner* — Tony Ko
*Assistant Examiner* — Magda Cruz
(74) *Attorney, Agent, or Firm* — IPUSA, PLLC

(57) ABSTRACT

A projection optical system includes a first optical system, a second optical system, and first and second reflection mirrors. The first and second reflection mirrors are arranged on an optical path between an image forming element and a reflection surface of the second optical system, so that a direction of an optical path of light beams from the second reflection mirror to the reflection surface contains a component of a direction opposite to a predetermined direction from the image forming element to the first optical system, and a projection image of the image forming element on a conjugate surface, a projection of the reflection surface onto the conjugate surface, and a projection of the image forming element onto the conjugate surface are arrayed in this order on the conjugate surface.

10 Claims, 11 Drawing Sheets

PROJECTION OPTICAL SYSTEM AND IMAGE PROJECTION DEVICE

BACKGROUND OF THE INVENTION

1. Field of the Invention

The present disclosure relates to a projection optical system, and an image projection device including a projection optical system.

2. Description of the Related Art

An LCD (liquid crystal display) projector is widely known as an image projection device. In recent years, with high-resolution images of liquid crystal panels and efficient energy control of light source lamps, the development of LCD projectors with increased brightness and lower prices is in progress. Small-size, light-weight image projection devices using a DMD (digital micro-mirror device) have spread, and such image projection devices are widely used at offices, schools, households, etc. Especially, front type projectors have good portability among the LCD projectors and may be conveniently used at small meetings or the like. Some examples of image projection devices will be described in the following.

For example, Japanese Laid-Open Patent Publication No. 2006-235516 discloses a projection optical system, and an image projection device using the projection optical system. The projection optical system is arranged to have a small projection distance. In the projection optical system, an intermediate image of the image forming element is formed by a first optical system including a lens group, and a light beam is greatly raised by a second optical system including a concave surface mirror, so that an image corresponding to the intermediate image is formed on a screen.

Japanese Laid-Open Patent Publication No. 2009-204846 discloses an image projection device in which a mirror is disposed between a concave surface mirror and a screen, and a light beam reflected from the mirror passes through a portion between a lens group and the concave surface mirror and is directed to a screen. The vertical positional relation of the screen to the optical axis of the lens group is equated to that of the concave surface mirror to the optical axis of the lens group.

Japanese Patent No. 4223936 discloses an image projection device in which a flat surface mirror is disposed between the optical path of a lens part and a mirror part of a projection optical system to bend the optical path about 90 degrees. The lens part is arranged upright to prevent the projection optical system from projecting to the screen surface.

Japanese Laid-Open Patent Publication No. 2009-116149 discloses an image projection device in which a projection optical system including a concave surface mirror is arranged. The image projection device includes a screen, a reflection optical part having a curved surface mirror disposed on the projection surface of the screen, a bending mirror disposed before the reflection optical part on the optical path and on the non-projection surface of the screen, a refraction optical part disposed before the reflection optical part on the optical path and on the non-projection surface of the screen, and an image forming optical part disposed on the non-projection surface of the screen.

However, in the image projection device disclosed in Japanese Laid-Open Patent Publication No. 2006-235516, if the image forming element, the first optical system, and the second optical system are arranged in the housing of the image projection device and an image is projected on the external screen, the housing projects over the screen surface, and there has been a problem that the image projection device has to be embedded in the wall. It has been difficult to obtain an optimal projection distance. Even if the image is projected, the resulting image may become out of focus.

In the projection optical system in the image projection device of Japanese Laid-Open Patent Publication No. 2006-235516, an intermediate image is formed with the lens group and imaging of the intermediate image is performed on the screen using the concave surface mirror, so that the image of the image forming element is generated. In this projection optical system, the image forming element is shifted relative to the lens optical axis and the light beam is raised by the concave surface mirror. As a result, the projection distance can be made short. Therefore, the position of the concave surface mirror to the lens optical axis is opposite to the position of the screen to the lens optical axis, and if the image is projected above the optical axis, the concave surface mirror must be arranged below the optical axis. Hence, there has been a problem that the housing must have a large thickness at its lower portion, and the overall housing must be bulky.

In the image projection device disclosed in Japanese Laid-Open Patent Publication No. 2009-204846, when the image projection device is arranged on a desk to project an image on a wall disposed above the desk, the projection plane (namely, a screen) must be disposed above the lens optical axis. Apart from the teaching of Japanese Laid-Open Patent Publication No. 2006-235516, the concave surface mirror is arranged above the optical axis. Hence, if the concave surface mirror can be folded up when the image projection device is not in use and can be restored in its original position when it is in use, then it is possible to make the housing compact at the time of non-use, and the problem that the overall housing is bulky can be avoided.

However, it is difficult to eliminate the problem that the image projection device must be embedded in the wall, when it is necessary to arrange the image projection device under certain conditions of the projection distance. If the projection distance can be made comparatively large, the light beam directed to the screen can pass through the intermediate portion between the lens and the concave surface mirror. However, if the projection distance is shortened (i.e., if the light beam is raised greatly), the size of the concave surface mirror must be large in the direction of departing from the optical axis and the power of the concave surface mirror is increased. The part that is located farthest from the optical axis of the concave surface mirror will interfere with the lens surface. Hence, there has been a problem that the light beam directed from the reflection mirror to the screen is interrupted by the concave surface mirror and cannot reach the screen.

In the image projection device disclosed in Japanese Patent No. 4223936, there is no need for arranging the image projection device by embedding the same in a wall. However, the image projection device has the structure in which the lens part stands upright. When the image projection device is arranged on a desk to project an image on a wall, the center of gravity of the image projection device arranged lies too high. There has been a problem that the image projection device easily falls on the desk. In such a case, the display surface of the image forming element faces upward and there has been a problem that the dust is easily deposited in the inside of the image projection device.

The image projection device disclosed in Japanese Laid-Open Patent Publication No. 2009-116149 is arranged such that the image projection device can be embedded in a wall. Japanese Laid-Open Patent Publication No. 2009-116149 does not suggest a method of arranging the image projection device without being embedded in the wall.

SUMMARY OF THE INVENTION

In one aspect, the present disclosure provides a projection optical system which allows slimming of a housing of an image projection device and is capable of projecting an image on a screen without embedding the image projection device in a wall.

In an embodiment which solves or reduces one or more of the above-mentioned problems, the present disclosure provides a projection optical system which is arranged to cause a number of light beams output from an image forming element on a first conjugate surface to slantingly enter a second conjugate surface and project an enlarged image of an image formed by the image forming element, on the second conjugate surface, the projection optical system including: a first optical system disposed on a first optical path between the image forming element and the second conjugate surface and including a refracting optical system; a second optical system disposed on the first optical path at a downstream position of the first optical system and including a reflection surface having a positive power; and first and second reflection mirrors disposed in this order on a second optical path between the image forming element and the reflection surface to reflect the light beams along the second optical path, wherein the first and second reflection mirrors are arranged so that a direction of an optical path of the light beams from the second reflection mirror to the reflection surface contains a component of a direction that is opposite to a predetermined direction from the image forming element to the first optical system, and a projection image of the image forming element on the second conjugate surface, a projection of the reflection surface onto the second conjugate surface, and a projection of the image forming element onto the second conjugate surface are arrayed in this order on the second conjugate surface.

Other objects, features and advantages of the present disclosure will become more apparent from the following detailed description when read in conjunction with the accompanying drawings.

DETAILED DESCRIPTION OF THE PREFERRED EMBODIMENTS

A description will be given of embodiments of the present disclosure with reference to the accompanying drawings.

Figure 1:
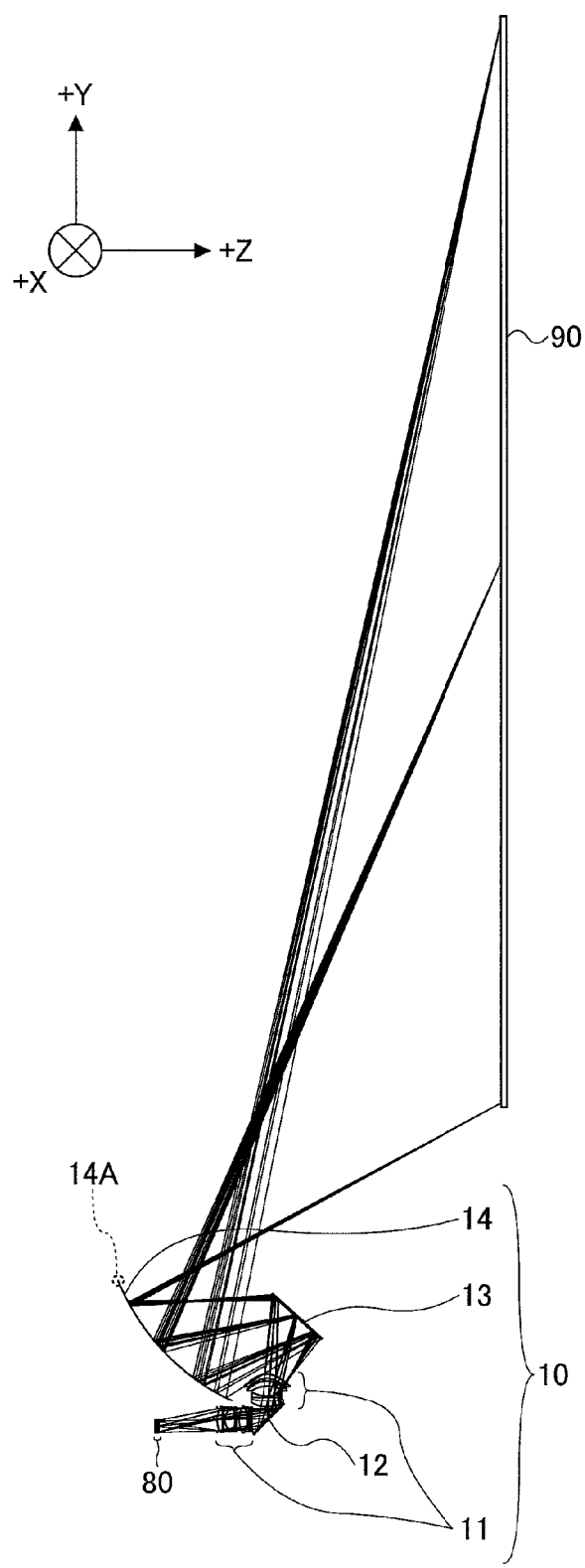
FIG. 1 is a diagram illustrating an optical path of a projection optical system of a first embodiment of the present disclosure.
Figure 2:
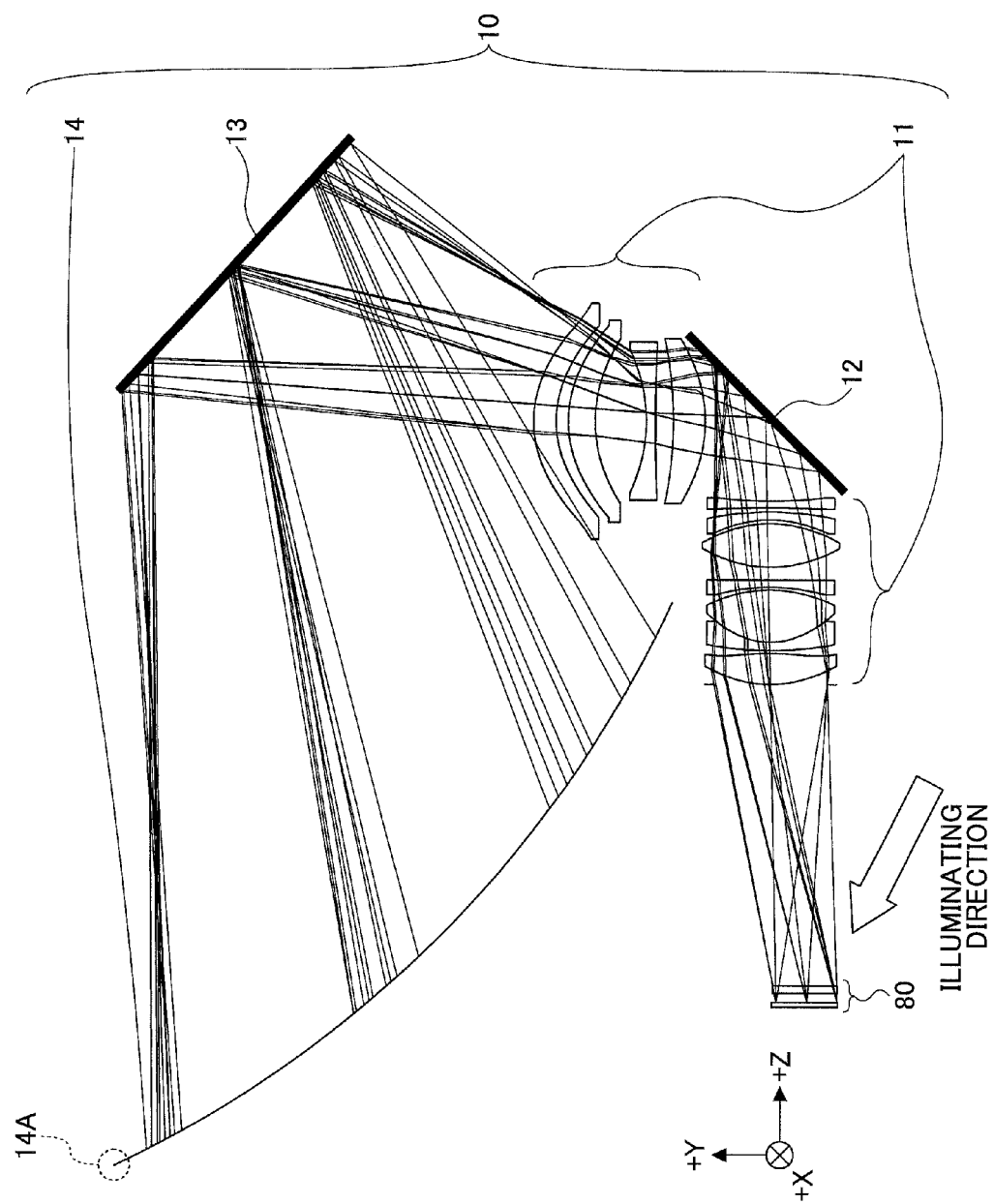
FIG. 2 is an enlarged diagram of a part of the optical path of the projection optical system of FIG. 1.

FIG. 1 is a diagram illustrating an optical path of a projection optical system of a first embodiment of the present disclosure. FIG. 2 is an enlarged diagram of a part of the optical path of FIG. 1.

In the coordinate system of FIG. 1 and FIG. 2, X denotes a longitudinal direction of a screen, Y denotes a transverse direction of the screen, and Z denotes a direction of the normal to the screen. Specifically, the direction of +X refers to the height direction of the drawing sheet, the direction of −X refers to the depth direction of the sheet, the direction of −Y refers to the down direction of the sheet, the direction of +Y refers to the up direction of the sheet, the direction of +Z refers to the right direction of the sheet, and the direction of −Z refers to the left direction of the sheet.

As illustrated in FIG. 1 and FIG. 2, the projection optical system 10 includes a first optical system 11, a first reflection mirror 12, a second reflection mirror 13, and a second optical system 14. Reference numeral 80 denotes an image forming element (which will be referred to as the image forming element 80), and reference numeral 90 denotes a screen (which will be referred to as the screen 90).

The image forming element 80 is disposed on a first conjugate surface (which will be referred to as the conjugate surface A), and the screen 90 is disposed on a second conjugate surface (which will be referred to as the conjugate surface B). In the following, the conjugate surface refers to one of a pair of surfaces including a first surface (object surface) from which a number of light beams are diverged and a second surface (image surface) to which the number of light beams are converged.

The projection optical system 10 is arranged to cause a number of light beams output from the image forming element 80 on the conjugate surface A, to slantingly enter the conjugate surface B and project an enlarged image of an image formed by the image forming element 80, onto the screen 90 on the conjugate surface B. In the projection optical system 10, the first optical system 11 is an optical system including at least one refracting optical system.

In this embodiment, the first optical system 11 is composed of eleven lenses, but the present disclosure is not limited to this embodiment.

The second optical system 14 is an optical system including at least one reflection surface having a positive power. It is preferred that the reflection surface having the positive power included in the second optical system 14 has a configuration of an anamorphic polynomial free-form surface. In such a case, for every reflection region with respect to each of image heights, the curved surface configuration of the reflection surface can be adjusted and the aberration compensation performance can be improved.

Supposing that on the basis of the projection image surface, X denotes the right/left direction, Y denotes the up/down direction, Z denotes a depth of the free-form surface, and X2, Y2, X2Y, Y3, X4, X2Y2, Y4, etc. denote respective coefficients, the anamorphic polynomial free-form surface has a configuration that is represented by the following formula (1).

$$Z = X2x^2 + Y2y^2 + X2Yx^2y + Y3y^3 + X4x^4 + X2Y2x^2y^2 + Y4y^4 + \\ X4Yx^4y + X2Y3x^2y^3 + Y5y^5 + X6x^6 + X4Y2x^4y^2 + \\ X2Y4x^2y^4 + Y6y^6 + \ldots \quad (1)$$

In the example of FIG. 1 and FIG. 2, the second optical system 14 includes only a concave surface mirror which provides a reflection surface having a positive power. Namely, in this embodiment, the second optical system 14 is the concave surface mirror itself. However, the second optical system 14 according to the present disclosure is not limited to the concave surface mirror. Alternatively, a reflection optical element having a condensing power, such as a Fresnel mirror and a hologram mirror, may be used instead as the second optical system 14.

The first reflection mirror 12 and the second reflection mirror 13 are disposed on the optical path between the image forming element 80 and the second optical system 14. Specifically, the first reflection mirror 12 and the second reflection mirror 13 are arranged by rotating a corresponding surface of the mirrors 12 and 13 around the axis parallel to the longitudinal direction (the direction of X) of the image projected on the screen 90, so that the light beams output from the image forming element 80 in the direction of +Z are reflected to the second optical system 14 in the direction of −Z by the second reflection mirror 13. Further, the first reflection mirror 12 and the second reflection mirror 13 are arranged so that the projection image of the image forming element 80 on the screen 90 (on the conjugate surface B), the projection of the second optical system 14 onto the conjugate surface B, and the projection of the image forming element 80 onto the conjugate surface B are arrayed in this order in the direction of −Y on the conjugate surface B.

In other words, the first reflection mirror 12 and the second reflection mirror 13 are disposed on the optical path between the image forming element 80 and the second optical system 14, so that, when the screen 90, the projection optical system 10 and the image forming element 80 are viewed from the direction of the normal to the conjugate surface B (or the Z direction), the screen 90, the second optical system 14 of the projection optical system 10, and the image forming element 80 are arrayed in this order on the conjugate surface B in the direction of −Y.

Figure 3:
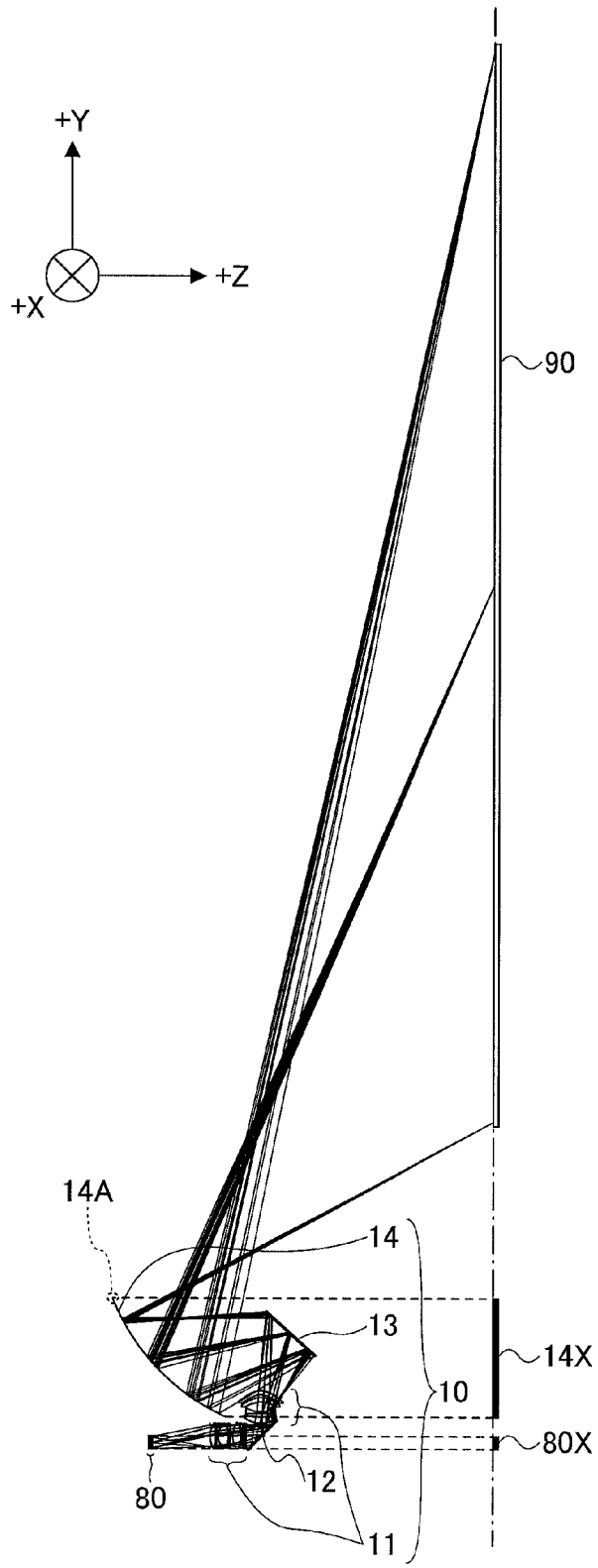
FIG. 3 is a diagram for explaining the arrangement of two reflection mirrors.

This arrangement of the first reflection mirror 12 and the second reflection mirror 13 is illustrated in FIG. 3. In FIG. 3, reference numeral 14X denotes the projection of the second optical system 14 onto the conjugate surface B (which will be referred to as the projection 14X), reference numeral 80X denotes the projection of the image forming element 80 onto the conjugate surface B (which will be referred to as the projection 80X), and the one-dotted chain line denotes the conjugate surface B.

As illustrated in FIG. 3, the screen 90 (=the projection image of the image forming element 80 on the screen 90), the projection 14X and the projection 80X are arrayed in this order on the conjugate surface B. The first reflection mirror 12 and the second reflection mirror 13 are arranged so that the screen 90 (=the projection image of the image forming element 80 on the screen 90), the projection 14X and the projection 80X are arrayed as illustrated in FIG. 3.

With respect to the direction in which the light beams travel, the +Z direction involves the direction containing the component of the direction indicated by the arrow +Z in FIG. 1 and FIG. 2, and does not mean simply the direction indicated by the arrow +Z (or the direction parallel to the Z axis). For example, the light directed in the direction of +Z does not mean simply the light directed in the direction indicated by the arrow +Z (or the direction parallel to the Z axis) but involves the light directed in one of various directions containing the component of the direction indicated by the arrow +Z.

Similarly, with respect to the direction in which the light beams travel, the −Z direction involves the direction containing the component of the direction opposite to the direction indicated by the arrow +Z in FIG. 1 and FIG. 2, and does not mean simply the direction opposite to the direction indicated by the arrow +Z (or the direction parallel to the Z axis). For example, the light reflected in the direction of −Z does not mean simply the light reflected in the direction opposite to the direction indicated by the arrow +Z (or the direction parallel to the Z axis) but involves the light reflected in one of various directions containing the component of the direction opposite to the direction indicated by the arrow +Z.

In the projection optical system of this embodiment, the light beams output from the image forming element 80 (which is a light valve, such as a liquid crystal panel) enter the first optical system 11, the optical path of the light beams is rotated by 90 degrees by the first reflection mirror 12 which is disposed in the first optical system 11 (the surface of the first reflection mirror 12 is rotated clockwise by 45 degrees around the X axis), and the light beams are output from the first optical system 11. Subsequently, the optical path of the light beams is again rotated by 90 degrees by the second reflection mirror 13. The second reflection mirror 13 is disposed on the optical path between the first optical system 11 and the second optical system 14, and the surface of the second reflection mirror 13 is rotated counterclockwise by 45 degrees around the X axis.

Accordingly, the light beams output from the image forming element 80 in the direction of +Z are reflected in the opposite direction (or the direction of −Z) and enter the second optical system 14. The light beams are reflected by the second optical system 14 in the direction of +Z and enter the screen 90. When the light beams are delivered from the first optical system 11 to the second optical system 14, an intermediate image of the image forming element 80 is formed on the optical path between the first optical system 11 and the second optical system 14, and an enlarged image of the intermediate image is projected on the screen 90 by the reflection imaging function of the second optical system 14.

In the projection optical system of this embodiment, the first reflection mirror 12 and the second reflection mirror 13 may be arranged to change the optical path of the light beams output from the image forming element 80 in the direction of +Z, to the opposite direction (the direction of −Z) and cause the light beams to enter the second optical system 14. Hence, the rotation angle of the surface of the first reflection mirror 12 and the second reflection mirror 13 is not limited to 45 degrees as in the foregoing embodiment.

Alternatively, the first reflection mirror 12 may be arranged on the optical path between the first optical system 11 and the second optical system 14, rather than being arranged in the first optical system 11 as in the foregoing embodiment. However, as will be described in the following, it is preferred that the first reflection mirror 12 is arranged in the first optical system 11.

In the projection optical system 10, the distortion aberrations occurring in the whole optical system included in the projection optical system 10 are controlled by the lenses in the second optical system 14 from among the lenses in the second optical system 14 and the first optical system 11. It is desired that the light beams for each angle of view are mutually separated. In the first optical system 11, the lens having the largest negative power is disposed on the side of the first optical system 11 near the second optical system 14. Specifically, in the example of FIG. 1 and FIG. 2, the third lens (the surface identifier L3 in TABLE 1 given below), which is located at a third position from the side of the first optical system 11 near the second optical system 14, is the lens having the largest negative power. By the use of this lens, it is possible to make the light beams diverge greatly. Namely, in the region from the lens having the largest negative power (L3 in TABLE 1 given below) to the second optical system 14, the light beams for each angle of view are well separated and made to diverge greatly.

If a reflection mirror is disposed at a position where the light beams diverge greatly, the area of the reflection mirror must be enlarged and the size of the whole projection optical system will be enlarged. In this case, the width of the angles of incidence to the reflection mirror must also be enlarged, and the incident angle characteristics of the reflection film on the reflection mirror will have to be increased. Hence, the reflectivity of the whole optical system will fall and the output of the whole optical system will deteriorate.

The first reason why it is preferred that the first reflection mirror 12 is arranged in the first optical system 11 is as follows. If the first reflection mirror 12 and the second reflection mirror 13 are disposed in the region between the first optical system 11 and the second optical system 14, where the light beams diverge greatly, the areas of both the first reflection mirror 12 and the second reflection mirror 13 must be enlarged and the size of the whole optical system must be increased. This is not preferred.

The second reason is as follows. If not only the second reflection mirror 13 but also the first reflection mirror 12 is arranged in the region between the first optical system 11 and the second optical system 14, where the light beams diverge greatly, the width of the angles of incidence to each of the first reflection mirror 12 and the second reflection mirror 13 must be enlarged, and the incident angle characteristics of the reflection film on each mirror must be increased. Hence, the reflectivity of the whole optical system will fall and the output of the whole optical system will deteriorate. This is not preferred.

Accordingly, in this embodiment, at least one (the first reflection mirror 12) of the two reflection mirrors (the first reflection mirror 12 and the second reflection mirror 13) is arranged at a position in front of the position where the light beams from the first optical system 11 diverge greatly. Specifically, in this embodiment, the first reflection mirror 12 is disposed in the region between the image forming element 80 and the lens having the largest negative power (L3 in TABLE 1 given below) in the first optical system 11. Therefore, it is possible to prevent the increasing of the reflection surface area of the first reflection mirror 12, and because the width of the angles of incidence is small, it is possible to easily produce the reflection film of the reflection mirror.

Thus, in this embodiment, the size of the first reflection mirror 12 can be reduced. Moreover, the width of the angles of incidence to the reflection surface of the first reflection mirror 12 can be reduced, and it is possible to provide good reflection film characteristics for the whole optical system and increase the output of the whole optical system.

Alternatively, both the first reflection mirror 12 and the second reflection mirror 13 may be arranged in the region between the image forming element 80 and the lens having the largest negative power in the first optical system 11. However, as will be described in the following, it is preferred that only the first reflection mirror 12 is arranged in the first optical system 11.

Namely, if both the first reflection mirror 12 and the second reflection mirror 13 are arranged in the region between the image forming element 80 and the lens having the largest negative power in the first optical system 11, the length of the first optical system 11 must be large and the size of the whole optical system must be large. This is not preferred.

Accordingly, in this embodiment, only the first reflection mirror 12 is arranged in the first optical system 11 and the above problem is eliminated.

For example, the projection distance of the projection optical system 10 (the distance parallel to the Z axis between the far end 14A of the second optical system 14, distant from the screen 90, and the screen 90) can be set to 240.0 mm. The overall length of the projection optical system 10 when the projection optical system 10 is arranged in a linear formation (or the total distance from the image forming element 80 to the end 14A of the second optical system 14) can be set to 251.8 mm. Thus, the projection optical system 10 is an optical system in which the projection distance is shorter than the overall length when arranged in a linear formation.

Next, a description will be given of the advantageous features of the projection optical system 10 of the first embodiment when compared with a comparative example.

Figure 4:
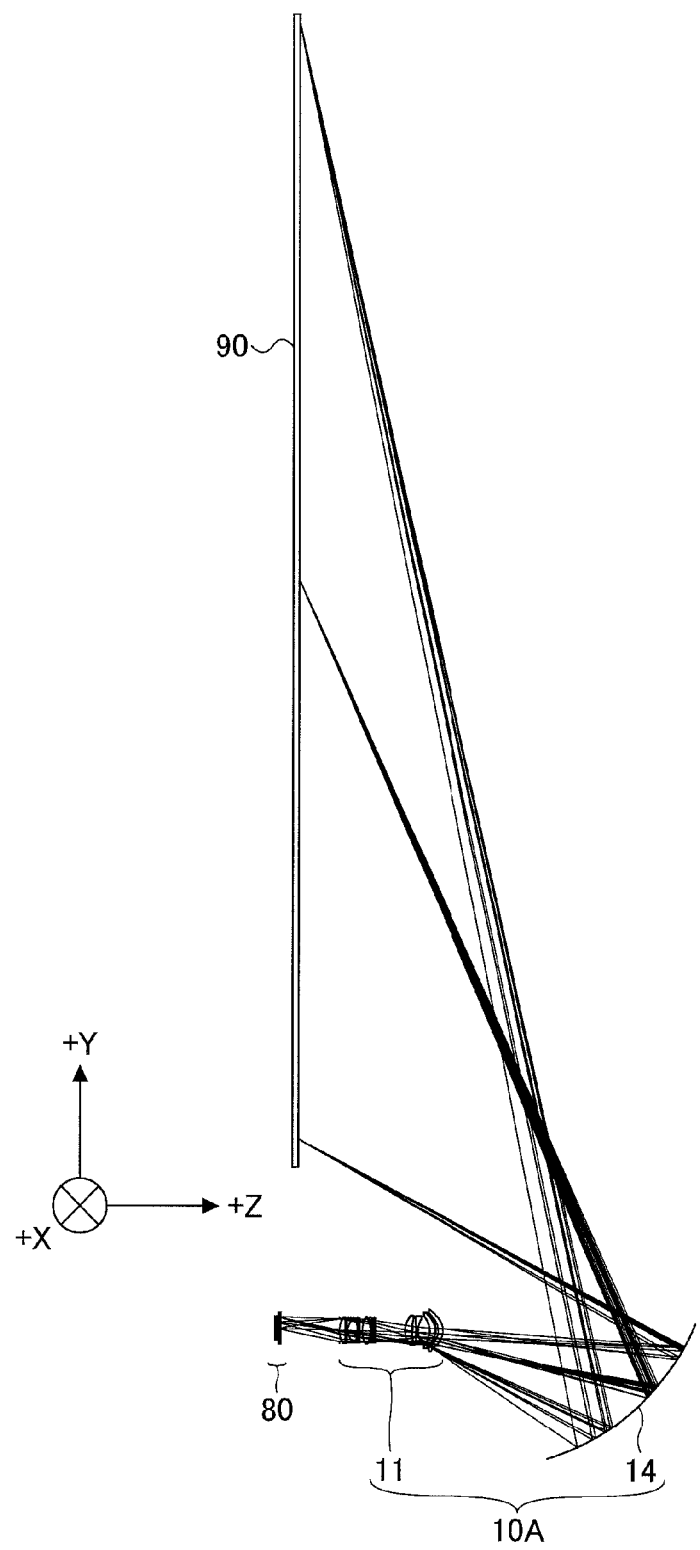
FIG. 4 is a diagram illustrating an optical path of a projection optical system of a comparative example.
Figure 5:
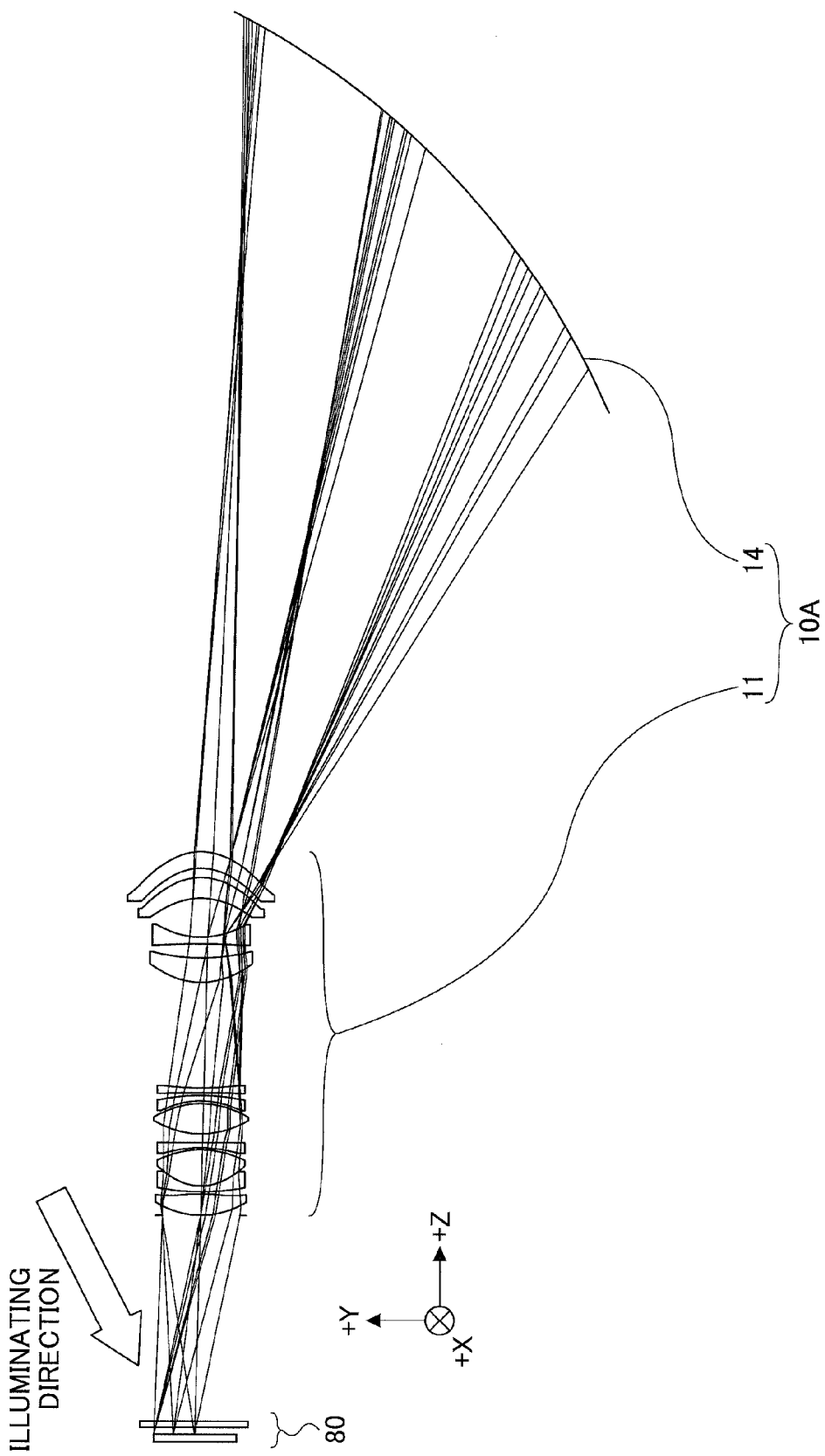
FIG. 5 is an enlarged diagram of a part of the optical path of the projection optical system of FIG. 4.

FIG. 4 is a diagram illustrating an optical path of a projection optical system of a comparative example. FIG. 5 is an enlarged diagram of a part of the optical path of FIG. 4.

The coordinate system illustrated in FIG. 4 and FIG. 5 is the same as the coordinate system illustrated in FIG. 1 and FIG. 2. As illustrated in FIG. 4 and FIG. 5, the projection optical system 10A of the comparative example differs from the projection optical system 10 of first embodiment in that the first reflection mirror 12 and the second reflection mirror 13 are not arranged and folding back of the optical path is performed solely by the second optical system 14 (the concave surface mirror). Except for the above matters, the composition of the projection optical system 10A is the same as the composition of the projection optical system 10.

As illustrated in FIG. 4 and FIG. 5, the projection optical system 10A does not include two reflection mirrors which are equivalent to the first reflection mirror 12 and the second reflection mirror 13 as in the projection optical system 10 and does not use the repeated folding back of the optical path. The light beams are directed from the image forming element 80 to the second optical system 14 in the direction of +Z, while the light beams are output from the second optical system 14 to the plane of incidence of the screen 90 in the direction of −Z. Namely, the direction of the light beams output from the second optical system 14 to the screen 90 in the projection optical system 10A is not the direction of +Z as in the projection optical system 10.

If the projection optical system 10A is an optical system in which the projection distance is shorter than the overall length when arranged in a linear formation, similar to the projection optical system 10, the image forming element 80 must be displaced in the direction of −Z from the position of the screen 90. This means that, for example, when it is desired to project an image onto the screen on a wall, the components of the projection optical system 10A are embedded in the wall. This will worsen the ease of use of the projection optical system 10A. Generally, when the projection size is the same, even if the projection distance is shortened, the overall length when arranged in a linear formation is not shortened. Hence, it is necessary that a part of the image projection device (or the components of the projection optical system) is embedded in a wall.

On the other hand, in the case of the projection optical system 10, the direction of the light beams reflected by the second reflection mirror 13 and directed to the second optical system (the direction of −Z) is opposite to the direction of the light beams output from the image forming element 80 to the first optical system 11 (the direction of +Z). The direction of the light beams output from the second optical system 14 (the direction of +Z) is the same as the direction of the light beams output from the image forming element 80 (the direction of +Z). Therefore, it is possible to eliminate the problem that the components of the projection optical system must be embedded in the wall as in the projection optical system 10A.

It is preferred that the projection optical system 10 is used with a DMD type image forming element in which micro mirrors are arrayed in a two-dimensional formation. The DMD type image forming element reflects the illuminating light in the two directions of ON/OFF so that an image is formed. In this case, the illuminating light must slantingly enter the image forming element from an oblique direction. The lighting direction in this case is the same as that of a projection optical system of a general-purpose projector, and it is possible to provide good compatibility.

Namely, when a general-purpose projector including a projection optical system according to the related art which is composed of only a set of lenses without using the second optical system 14 (the concave surface mirror) is used, the projector is disposed on a desk and activated to project on a wall which is located apart from the desk. In the case of the projection optical system using the DMD type image forming element, an image is projected to an upper portion above the desk (in the direction of +Y), and the illuminating light to irradiate the image forming element is arranged slantingly under the image forming element.

On the other hand, in the case of the straight type projection optical system 10A of the comparative example, the image forming element 80 is shifted upward (the direction of +Y) from the optical axis of the first optical system 11. The direction of the illuminating light to illuminate the image forming element 80 is shifted further upward, and this direction is opposite to the direction of the projection optical system according to the related art which is composed of only the lenses without using the second optical system 14 (the concave surface mirror) (refer to FIG. 5).

On the other hand, in the case of the projection optical system 10 using the second optical system 14, the image forming element 80 is shifted downward (the direction of −Y) to the optical axis of the first optical system 11 because the light beams are raised slantingly upward (the direction of +Y) by using the second optical system 14. Namely, in the projection optical system 10, the folding back of the optical path is performed and the panel shifting of the image forming element 80 is performed downward (the direction of −Y) to the optical axis of the first optical system 11, and the direction of the illuminating light to illuminate the image forming element 80 is also the downward direction (the direction of −Y) (refer to FIG. 2).

Unlike the straight type projection optical system 10A, when the DMD type image forming element 80 is used with the projection optical system 10 of this embodiment, the lighting direction can be the same as that of the projection optical system of the general-purpose projector, and it is possible for this embodiment to provide good compatibility.

In the case of the projection optical system 10 of this embodiment, the illumination optical system is arranged in the lower part of the image forming element 80, the center of gravity of the image projection device is lowered, and the installation of the image projection device on a desk can be stabilized.

Thus, according to the first embodiment, the slimming of the housing is possible, and it is possible to provide a projection optical system which is capable of projecting an image without being embedded in a wall.

Next, a second embodiment of the present disclosure will be described.

In the second embodiment, an image projection device including the projection optical system of the first embodiment is illustrated. In the second embodiment, the elements which are the same as corresponding elements in the first embodiment are designated by the same reference numerals and a description thereof will be omitted.

Figure 6:
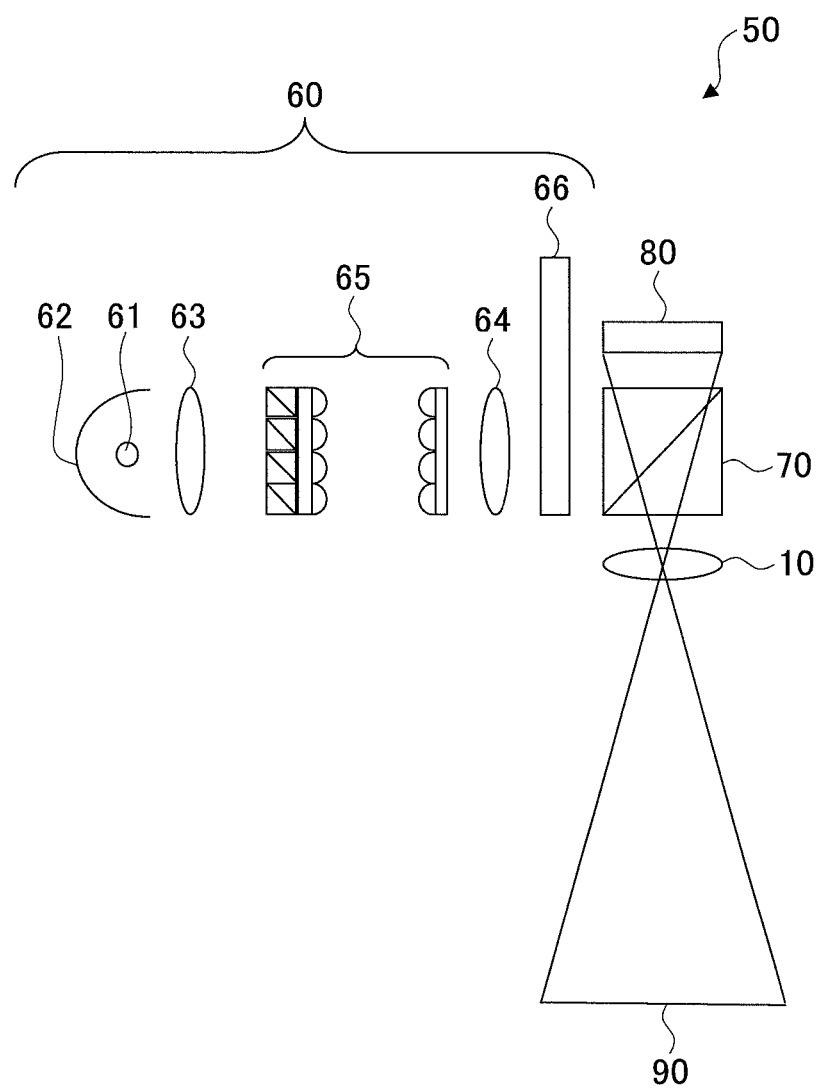
FIG. 6 is a diagram illustrating the composition of an image projection device of a second embodiment of the present disclosure.

FIG. 6 is a diagram illustrating the composition of an image projection device of the second embodiment. As illustrated in FIG. 6, the image projection device 50 of the second embodiment includes the projection optical system 10 of the first embodiment, an illumination optical system 60, a separator unit 70, and an image forming element 80.

The image projection device 50 may be arranged to further include a power source for illumination, a modulation unit for the image forming element 80, an image processing unit, etc. which are not illustrated.

For example, the illumination optical system 60 is constructed to include a light source 61, a reflector 62 (which may be integrated with the light source 61) disposed in the vicinity of the light source 61, relay lenses 63 and 64, and a light intensity integrator optical system 65. The light intensity integrator optical system 65 equalizes the light intensity of light beams which are reflected by the reflector 62 and have directivity. The illumination optical system 60 is arranged so that uniform lighting distribution is obtained on the surface of the image forming element 80.

Examples of the light source 61 may include a halogen lamp, a xenon lamp, a metal halide lamp, an extra high pressure mercury lamp, an LED (light emitting diode), etc.

The illumination optical system 60 may include a color wheel 66. The color wheel 66 is used to colorize the illuminating light and the imaging of the image forming element 80 is controlled in a synchronous manner, so that a color image may be projected on the screen.

When a reflection type liquid crystal image forming element is used as the image forming element 80, the separator unit 70 is used to separate the optical path into an illumination optical path and a projection optical path. In such a case, it is possible to provide more efficient lighting.

When a DMD (digital micro-mirror device) type image forming element is used as the image forming element 80, a total reflection prism may be used as the optical path separator unit 70. In this manner, an appropriate optical system may be selectively used in accordance with the type of the image forming element 80 used.

For example, the illuminating light is passed through each of color filters of blue, red and green and supplied to the image forming element 80 respectively, and the combined light generated from the color light beams by the color coupling unit is caused to enter the projection optical system 10 so that a color image may be projected on the screen 90.

In the image projection device 50, the image forming element 80 forms an image by the illuminating light in accordance with a modulating signal. The illuminating light from the light source 61 is supplied to the image forming element 80, and an enlarged image of the image formed by the image forming element 80 is projected onto the screen 90 by the projection optical system 10.

Next, a third embodiment of the present disclosure will be described.

In the third embodiment, an image projection device including the projection optical system of the first embodiment is illustrated. In the third embodiment, the elements which are the same as corresponding elements in the first embodiment are designated by the same reference numerals and a description thereof will be omitted.

Figure 7:
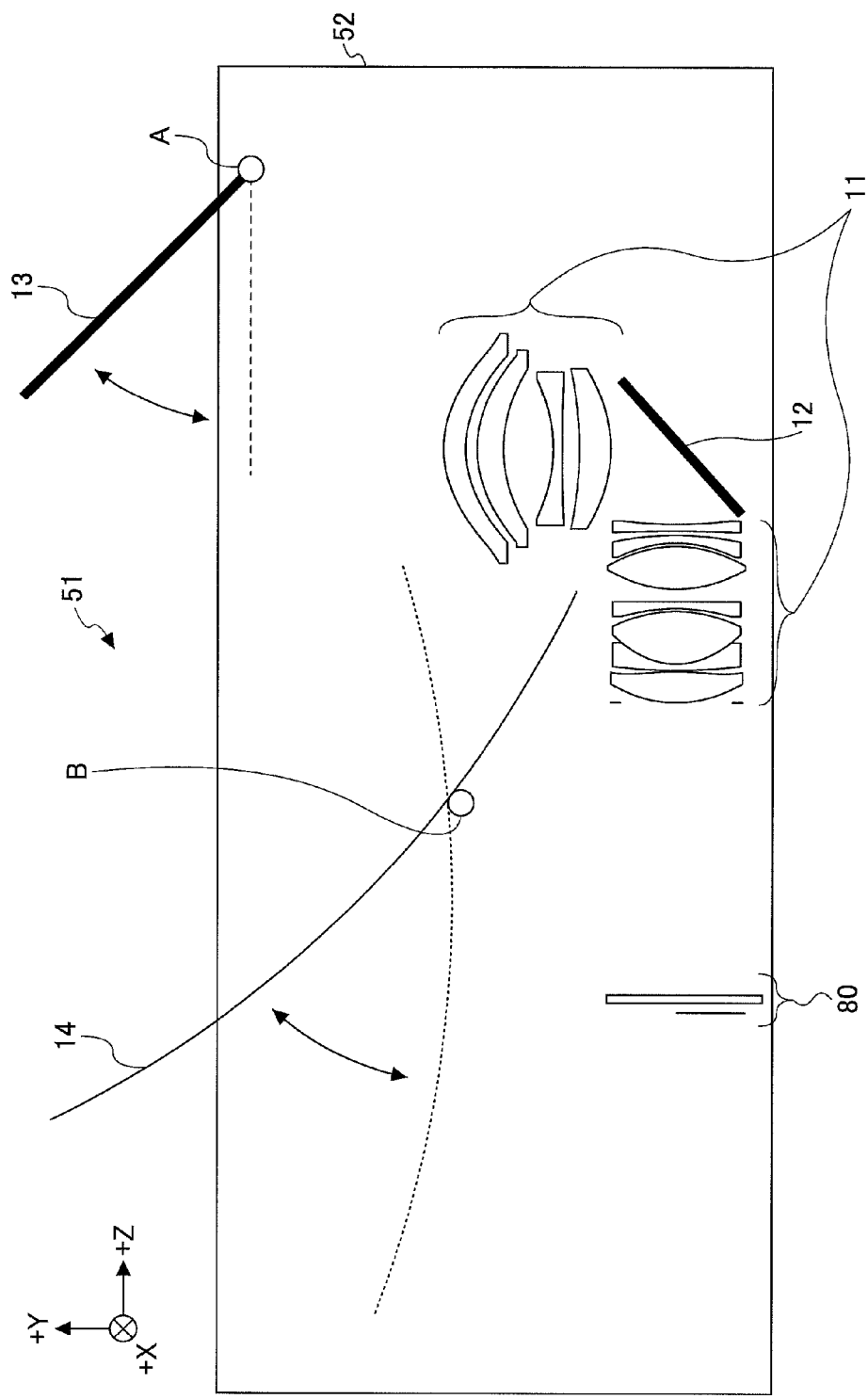
FIG. 7 is a diagram illustrating the composition of an image projection device of a third embodiment of the present disclosure.

FIG. 7 is a diagram illustrating the composition of the image projection device of the third embodiment. As illustrated in FIG. 7, the image projection device 51 of the third embodiment has the composition that is basically the same as that of the image projection device 50 of the second embodiment. The image projection device 51 of the third embodiment includes the projection optical system 10 of the first embodiment, the image forming element 80, and an illumination optical system which is not illustrated.

When the image projection device 51 is installed on, for example, a desk to project an image on a wall (or when the image projection device 51 is in use), the second reflection mirror 13 and the second optical system 14 are arranged to fully or partially protrude from the housing 52 of the image projection device 51 which is in the shape of a rectangular parallelepiped. At this time, all other components of the image projection device 51 are accommodated in the housing 52.

However, the second reflection mirror 13 and the second optical system 14 are arranged to be movable to the housing 52. When the image projection device 51 is not in use (for example, in a case of carrying the image projection device 51), the second reflection mirror 13 and the second optical system 14 are moved and can be fully accommodated in the housing 52. For example, the second reflection mirror 13 and the second optical system 14 may be arranged so that the second reflection mirror 13 and the second optical system 14 are respectively rotatable around the shaft A and the shaft B which are disposed in parallel with the X axis. Namely, the second reflection mirror 13 and the second optical system 14 can be accommodated in the housing 52 by rotating them in the directions indicated by the arrows in FIG. 7.

For example, the top surface of the housing 52 (which lies in the direction of +Y) is closed by a transparent material, such as glass, and the corresponding portions of the second reflection mirror 13 and the second optical system 14 on the top surface of the housing 52 are opened. When the image projection device 51 is in use, the second reflection mirror 13 and the second optical system 14 are rotated from the position (accommodation position) indicated by the dotted line to the use position indicated by the solid line, and each of these components is positioned by a stopper (not illustrated). On the other hand, when the image projection device 51 is not in use, the second reflection mirror 13 and the second optical system 14 are accommodated in the housing at the position (accommodation position) indicated by the dotted line.

The rotation of the second reflection mirror 13 and the second optical system 14 may be performed manually. Alternatively, an actuator, such as a motor and a solenoid, may be installed as a drive source that is used to automatically perform the rotation of the second reflection mirror 13 and the second optical system 14. In such a case, the driving of the rotation can be remotely controlled.

In this embodiment, the second reflection mirror 13 and the second optical system 14 are arranged to be movable to the housing, and the second reflection mirror 13 and the second optical system 14 are moved and accommodated in the housing 52 when the image projection device 51 is not in use. Hence, the slimming of the housing 52 is possible, and this is desirable when the image projection device 51 is carried. If the height (in the direction of Y) of the housing 52 is set to the minimum height that is required to accommodate the first optical system 11 in the state in which the unnecessary space does not exist, the slimming of the housing 52 is possible in a desired manner.

In a case in which either the second reflection mirror 13 or the second optical system 14 is to be arranged to protrude from the housing 52 when the image projection device 51 is in use, it is sufficient that only the component which protrudes from the housing 52 is arranged to be movable.

Next, a modification of the third embodiment will be described. In this modification, the second reflection mirror 13 and the second optical system 14 are arranged to be movable in a different manner. In the modification of the third embodiment, the elements which are the same as corresponding elements in the third embodiment are designated by the same reference numerals, and a description thereof will be omitted.

Figure 8:
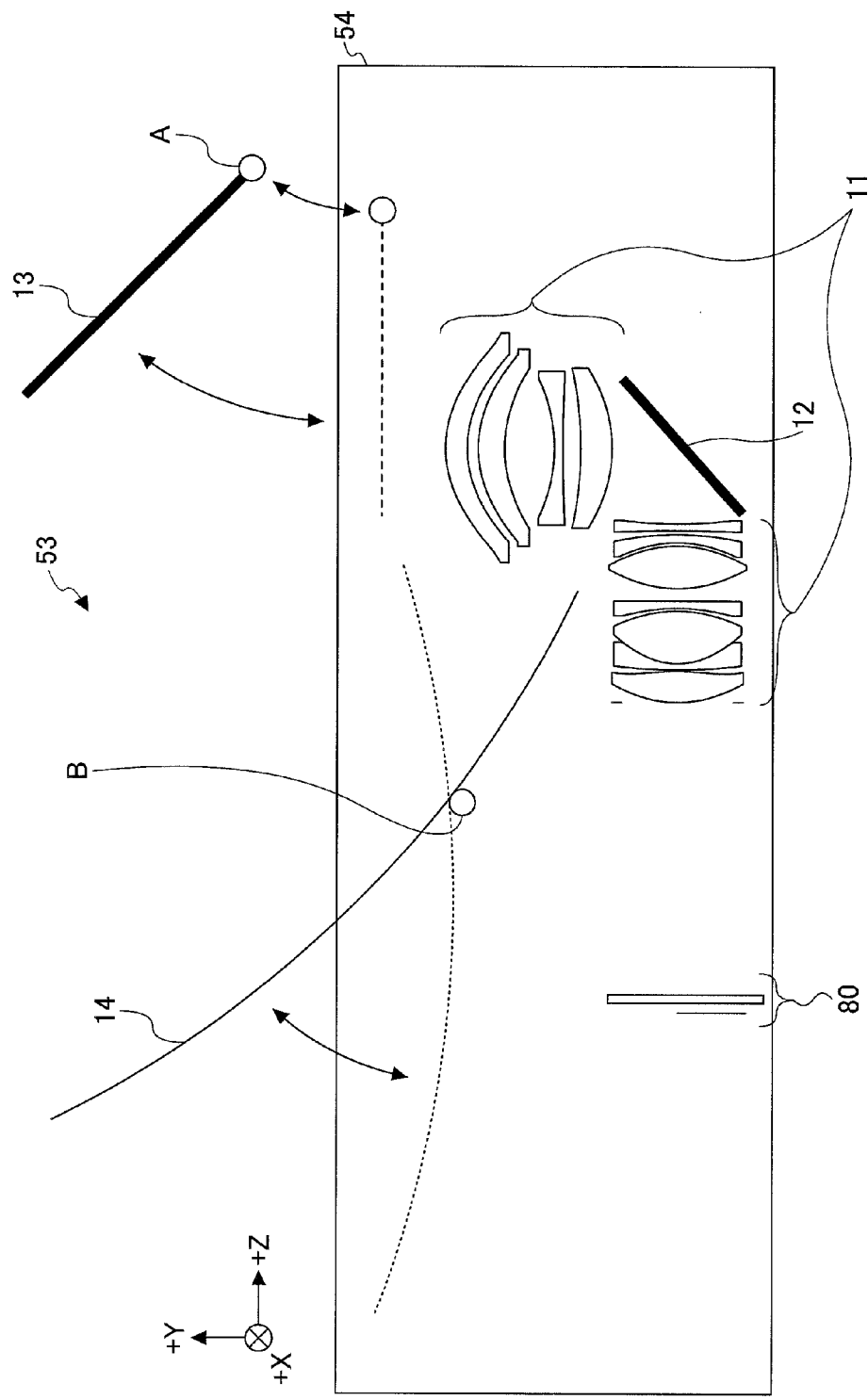
FIG. 8 is a diagram illustrating a modification of the image projection device of the third embodiment.

FIG. 8 is a diagram illustrating the composition of an image projection device of the modification of the third embodiment. As illustrated in FIG. 8, the image projection device 53 of this modification has the composition that is basically the same as that of the image projection device 50 of the second embodiment. The image projection device 53 of this modification includes the projection optical system 10 of the first embodiment, the image forming element 80, and an illumination optical system which is not illustrated.

Similar to the image projection device 51 (refer to FIG. 7), the second reflection mirror 13 and the second optical system 14 in the image projection device 53 are arranged to protrude from the housing 54 when the image projection device 53 is in use. At this time, all other components of the image projection device 53 are accommodated in the housing 54.

The second optical system 14 is arranged to be movable to the housing 54. For example, it is arranged to be rotatable around the shaft B which is disposed in parallel with the X axis, similar to the image projection device 51. Hence, the second reflection mirror 13 can be accommodated in the housing 54 by rotating the same in the direction indicated by the arrow in FIG. 8.

The second reflection mirror 13 is arranged to be movable to the housing 54. For example, it is arranged to be rotatable around the shaft A which is disposed in parallel with the X-axis, and further arranged to be movable in the downward direction (or the direction of −Y). Hence, the second reflection mirror 13 can be accommodated in the housing 54 by rotating the same in the direction indicated by the arrow and moving the same in the downward direction (or the direction of −Y).

In this modification, the configuration in which the second reflection mirror 13 is arranged to be rotatable and movable in the downward direction (the direction of −Y) is used, and the second reflection mirror 13 is accommodated in the housing 54. Hence, it is possible to make the housing 54 thinner than the housing 52.

In a case in which either the second reflection mirror 13 or the second optical system 14 is to be arranged to protrude from the housing 52 when the image projection device 51 is in use, it is sufficient that only the component which protrudes from the housing 52 is arranged to be movable.

Next, some examples of numerical data of the projection optical system 10 of the present disclosure will be illustrated. An example of the numerical data of the projection optical system 10 of an embodiment of the present disclosure will be given in TABLE 1 below.

TABLE 1

| SURFACE ID | NAME | RADIUS OF CURVATURE (mm) | SURFACE SEPARATION (mm) | REFRACTIVE INDEX | ABBE'S NUMBER | ASPHERICAL SURFACE | POLYNOMIAL FREE-FORM SURFACE | REFLECTION SURFACE | DECENTERING & TILT |
|---|---|---|---|---|---|---|---|---|---|
| OBJECT | | | 1.11 | | | | | | |
| 1 | CG | | 1.05 | 1.507 | 63.4 | | | | |
| 2 | | | 36.89 | | | | | | |
| 3 | AP | | 0.01 | | | | | | ○ |
| 4 | L11 | 23.278 | 3.84 | 1.514 | 63.3 | ○ | | | |
| 5 | | −83.514 | 0.15 | | | ○ | | | |
| 6 | L10 | 52.688 | 0.98 | 1.883 | 40.8 | | | | |
| 7 | L9 | 12.290 | 6.74 | 1.487 | 70.4 | | | | |
| 8 | | −19.787 | 0.20 | | | | | | |
| 9 | L8 | −32.971 | 0.95 | 1.713 | 29.5 | | | | |
| 10 | | −624.763 | 1.57 | | | | | | |
| 11 | L7 | 19.999 | 5.47 | 1.581 | 40.9 | | | | |
| 12 | | −19.352 | 0.30 | | | | | | |
| 13 | L6 | −18.694 | 0.93 | 1.883 | 40.8 | | | | |
| 14 | | −47.277 | 0.50 | | | | | | |
| 15 | L5 | −169.692 | 0.92 | 1.497 | 81.6 | | | | |
| 16 | | 68.197 | 9.50 | | | | | | |
| 17 | | | −9.50 | | | | | ○ | ○ |
| 18 | L4 | −17.250 | −4.18 | 1.673 | 32.2 | | | | |
| 19 | | −33.728 | −2.59 | | | | | | |
| 20 | L3 | 105.151 | −1.10 | 1.883 | 40.8 | | | | |
| 21 | | −18.352 | −7.01 | | | | | | |
| 22 | L2 | 12.842 | −3.58 | 1.531 | 55.8 | ○ | | | |
| 23 | | 14.920 | −1.61 | | | ○ | | | |
| 24 | L1 | 17.823 | −3.15 | 1.531 | 55.8 | ○ | | | |
| 25 | | 16.040 | −13.16 | | | ○ | | | |
| 26 | | | −46.00 | | | | | | |
| 27 | | | 42.00 | | | | | ○ | ○ |
| 28 | M1 | 1110.590 | −193.16 | | | | ○ | ○ | ○ |
| IMAGE | | | 0.00 | | | | | | |

In the TABLE 1, the SURFACE ID is an identification number given to each of the surfaces of the projection optical system 10 arrayed in the direction from the object surface to the image surface. Specifically, the surface identifier 1 refers to one of the surfaces of the cover glass of the image forming element 80 (which surface is located apart from the first optical system 11), the surface identifier 2 refers to the other surface of the cover glass, the surface identifiers 3 to 16 refer to the respective surfaces of the first optical system 11 arrayed in the direction of departing from the image forming element 80, the surface identifier 17 refers to the surface of the first reflection mirror 12, the surface identifiers 18 to 26 refer to the respective surfaces of the first optical system 11 arrayed in the direction of departing from the first reflection mirror 12, the surface identifier 27 refers to the surface of the second reflection mirror 13, and the surface identifier 28 refers to the surface of the second optical system 14.

In the NAME column of the TABLE 1, CG denotes the cover glass, AP denotes the aperture stop, L1-L11 denote the respective lenses, and M1 denotes the concave surface mirror. The RADIUS of CURVATURE denotes a radius of curvature of each surface to which the relevant surface identifier is attached. The SURFACE SEPARATION denotes a distance on the optical axis between the surface to which the relevant surface identifier is attached and the next surface adjacent to that surface. The REFRACTIVE INDEX denotes a refractive index of each lens which consists of the surface to which the relevant surface identifier is attached and the next surface adjacent to that surface. The dispersion is expressed as the Abbe's number. Each of the refractive index and the Abbe's number is expressed as a value on the d line.

The projection optical system of this example is provided by assuming that a reflection type image forming element having a diagonal line length of 0.55 and a ratio of the major axis to the minor axis (=4:3) is used as the image forming element 80. The center of the image forming element 80 is shifted by 5.5 mm downward (in the direction of −Y) from the lens optical axis of the first optical system 11 (which is inclusive of shift of the fourth surface thereof).

The projection size has a diagonal line length of 50 inches, and the projection magnification is about 90.9 times.

In this example, each of the two reflection mirrors (the first reflection mirror 12 and the second reflection mirror 13) is formed of a flat surface mirror. Alternatively, each reflection mirror may not be formed of a flat surface mirror if the reflection mirror has a function of folding back the optical path. However, using a flat surface mirror is preferred because the arrangement of the flat surface mirrors is easier and may be arranged to the optical path with lower accuracy.

In this example, the principal rays of each light beam that illuminates the image forming element 80 are not in parallel to each other, and the projection optical system of this example is a non-telecentric optical system. The first optical element in the first optical system 11 is an aperture stop (AP), and the second optical element (with the surface identifiers 4 and 5) is an aspheric surface lens. The aspherical surface used for the surface with the surface identifier 4, 5, 22, 23, 24 or 25 is formed of a rotational symmetric aspherical surface.

Suppose that Z denotes a depth in the optical axis direction, c denotes a paraxial radius of curvature, r denotes a distance from the optical axis in the direction perpendicular to the optical-axis direction, k denotes a cone coefficient, and A, B, C, . . . denote high order aspherical surface coefficients. The rotational symmetric aspherical surface is represented by the aspherical surface formula:

$$Z = cr^2/[1+\text{root}\{1-(1+k)c^2r^2\}] + Ar^4 + Br^6 + Cr^8 \ldots$$

The configuration of the rotational symmetric aspherical surface is defined by giving the values of the coefficients k, A, B, C . . . .

The aspherical surface coefficient data of the aspherical surface used for this embodiment is illustrated in the following TABLEs 2, 3, 4, 5, 6, and 7 for every surface of the projection optical system of this embodiment. The aspherical surface order of coefficients is illustrated in TABLE 8.

TABLE 2

| SURFACE ID | 4 |
|---|---|
| K | 0 |
| A | 7.02E−05 |
| B | −3.72E−09 |
| C | 2.84E−09 |
| D | −2.47E−11 |
| E | −1.62E−13 |
| F | 4.91E−15 |
| G | −9.55E−18 |

TABLE 3

| SURFACE ID | 5 |
|---|---|
| K | 0 |
| A | 6.47E−05 |
| B | 3.07E−08 |
| C | 1.28E−09 |
| D | 1.87E−11 |
| E | −9.06E−13 |
| F | 1.08E−14 |
| G | −2.09E−17 |

TABLE 4

| SURFACE ID | 22 |
|---|---|
| K | 0 |
| A | −9.32E−05 |
| B | −2.73E−06 |
| C | 1.18E−07 |
| D | −2.50E−09 |
| E | 2.80E−11 |
| F | −1.60E−13 |
| G | 3.61E−16 |

TABLE 5

| SURFACE ID | 23 |
|---|---|
| K | 0 |
| A | −5.45E−05 |
| B | 3.26E−08 |
| C | 1.46E−08 |
| D | −1.88E−10 |
| E | 5.83E−13 |
| F | 5.41E−15 |
| G | −3.41E−17 |

TABLE 6

| SURFACE ID | 24 |
|---|---|
| K | 0 |
| A | 7.64E−05 |
| B | 9.64E−07 |
| C | −7.72E−09 |
| D | 1.09E−11 |
| E | −5.11E−15 |
| F | −6.36E−16 |
| G | 1.72E−18 |

TABLE 7

| SURFACE ID | 25 |
|---|---|
| K | 0 |
| A | 4.55E−05 |
| B | 4.74E−07 |
| C | −1.03E−08 |
| D | 1.41E−10 |
| E | −1.30E−12 |
| F | 5.30E−15 |
| G | −7.80E−18 |

TABLE 8

| 4TH COEFFICIENT | A |
| 6TH COEFFICIENT | B |
| 8TH COEFFICIENT | C |
| 10TH COEFFICIENT | D |
| 12TH COEFFICIENT | E |
| 14TH COEFFICIENT | F |
| 16TH COEFFICIENT | G |

In the projection optical system of this embodiment, the aspherical surface is used for the optical element having the power and located nearest to the aperture stop (AP). Because the light beam of each angle of view similarly enters and illuminates the optical element, it is possible to easily correct the aberrations resulting from the size of the pupil (i.e., spherical aberration and coma aberration), and it is possible to provide good resolution on the screen 90.

The aspherical surface is used for the lens in which the principal rays of the light beam are farthest from the optical axis in the first optical system 11 (i.e., the lens nearest to the second optical system 14). The principal rays of the light beam of each angle of view at this lens are farthest from the optical axis, and it is possible to easily correct the aberrations resulting from the angle of view (i.e., distortion aberration, curvature of image surface, and astigmatism), and it is possible to provide good resolution on the screen 90.

The second optical system 14 (the concave surface mirror) with the surface identifier 28 is formed of a polynomial free-form surface. The configuration of the surface of the second optical system 14 is represented by the above-described formula 1. The polynomial free-form surface provides a design flexibility that is better than that of the aspherical surface configuration, and it is possible to provide good aberration compensation including the distortion aberration.

The free-form surface coefficients of the surface with the surface identifier 28 are illustrated in TABLE 9 below. The free-form surface coefficients correspond to the coefficients of the above-described formula 1. The amount of Y direction shift and the in YZ plane rotation of each of the surfaces with the surface identifiers 3, 17, 27 and 28 are illustrated in the following TABLEs 10, 11, 12 and 13 respectively.

TABLE 9

| SURFACE ID | 28 | | |
|---|---|---|---|
| X2 | −6.35E−03 | X10Y | −1.57E−18 |
| Y2 | −2.74E−03 | X8Y3 | −1.46E−18 |
| X2Y | 3.26E−05 | X6Y5 | 4.38E−19 |
| Y3 | 2.44E−06 | X4Y7 | 2.35E−18 |
| X4 | −2.59E−07 | X2Y9 | −4.45E−18 |
| X2Y2 | −4.83E−07 | Y11 | −7.93E−19 |
| Y4 | −8.60E−08 | X12 | −2.73E−20 |
| X4Y | 6.87E−09 | X10Y2 | 5.64E−20 |
| X2Y3 | 1.67E−09 | X8Y4 | −2.66E−20 |
| Y5 | −3.15E−09 | X6Y6 | −6.48E−20 |

TABLE 9-continued

| SURFACE ID | 28 | | |
|---|---|---|---|
| X6 | 6.78E−11 | X4Y8 | 6.85E−20 |
| X4Y2 | 4.78E−11 | X2Y10 | −9.45E−20 |
| X2Y4 | 9.88E−11 | Y12 | 5.48E−21 |
| Y6 | −1.20E−10 | X12Y | 3.00E−22 |
| X6Y | −7.50E−12 | X10Y3 | 1.10E−21 |
| X4Y3 | 6.45E−12 | X8Y5 | 3.67E−21 |
| X2Y5 | 8.70E−12 | X6Y7 | −4.10E−21 |
| Y7 | −1.39E−12 | X4Y9 | 3.10E−21 |
| X8 | −6.22E−14 | X2Y11 | 1.99E−22 |
| X6Y2 | −1.17E−13 | Y13 | 3.79E−22 |
| X4Y4 | −9.37E−14 | X14 | 4.53E−24 |
| X2Y6 | 1.01E−13 | X12Y2 | −1.92E−23 |
| Y8 | 6.13E−14 | X10Y4 | −6.29E−24 |
| X8Y | 4.78E−15 | X8Y6 | 5.54E−23 |
| X6Y3 | −3.17E−15 | X6Y8 | −7.64E−23 |
| X4Y5 | −9.29E−15 | X4Y10 | 6.69E−23 |
| X2Y7 | 3.49E−15 | X2Y12 | 1.74E−23 |
| Y9 | 2.10E−15 | Y14 | 4.10E−24 |
| X10 | 5.84E−17 | X14Y | −3.08E−26 |
| X8Y2 | 1.22E−17 | X12Y3 | −2.12E−25 |
| X6Y4 | 6.76E−17 | X10Y5 | −6.84E−25 |
| X4Y6 | −6.24E−17 | X8Y7 | 3.80E−25 |
| X2Y8 | 2.32E−17 | X6Y9 | −4.67E−25 |
| Y10 | −1.13E−17 | X4Y11 | 4.56E−25 |
|  |  | X2Y13 | 1.06E−25 |
|  |  | Y15 | 1.40E−26 |

TABLE 10

| SURFACE ID | 3 |
|---|---|
| Y-DIRECTION SHIFT (mm) | 1.35 |
| IN YZ PLANE ROTATION (degrees) | 0.0 |

TABLE 11

| SURFACE ID | 17 |
|---|---|
| Y-DIRECTION SHIFT (mm) | 0.00 |
| IN YZ PLANE ROTATION (degrees) | −45.0 |

TABLE 12

| SURFACE ID | 27 |
|---|---|
| Y-DIRECTION SHIFT (mm) | 0.00 |
| IN YZ PLANE ROTATION (degrees) | −45.0 |

TABLE 13

| SURFACE ID | 28 |
|---|---|
| Y-DIRECTION SHIFT (mm) | 65.83 |
| IN YZ PLANE ROTATION (degrees) | 52.7 |

Figure 9:
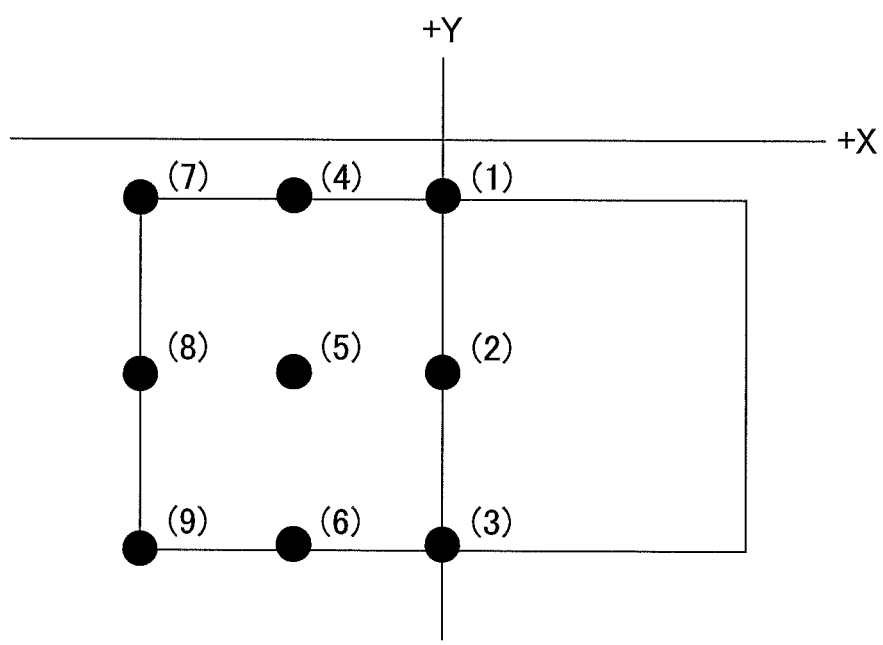
FIG. 9 is a diagram illustrating the positions of object points on the image forming element (conjugate surface A).

FIG. 9 is a diagram illustrating the positions of object points on the image forming element (the conjugate surface A). Nine lattice points (1)-(9) are illustrated in FIG. 9 which are obtained from the object points on the image forming element 80 on the XY surface in FIG. 1) in the area of X≤0 by dividing the area into three equal divisions in the direction of X and dividing the area into three equal divisions in the direction of Y.

Figure 10:
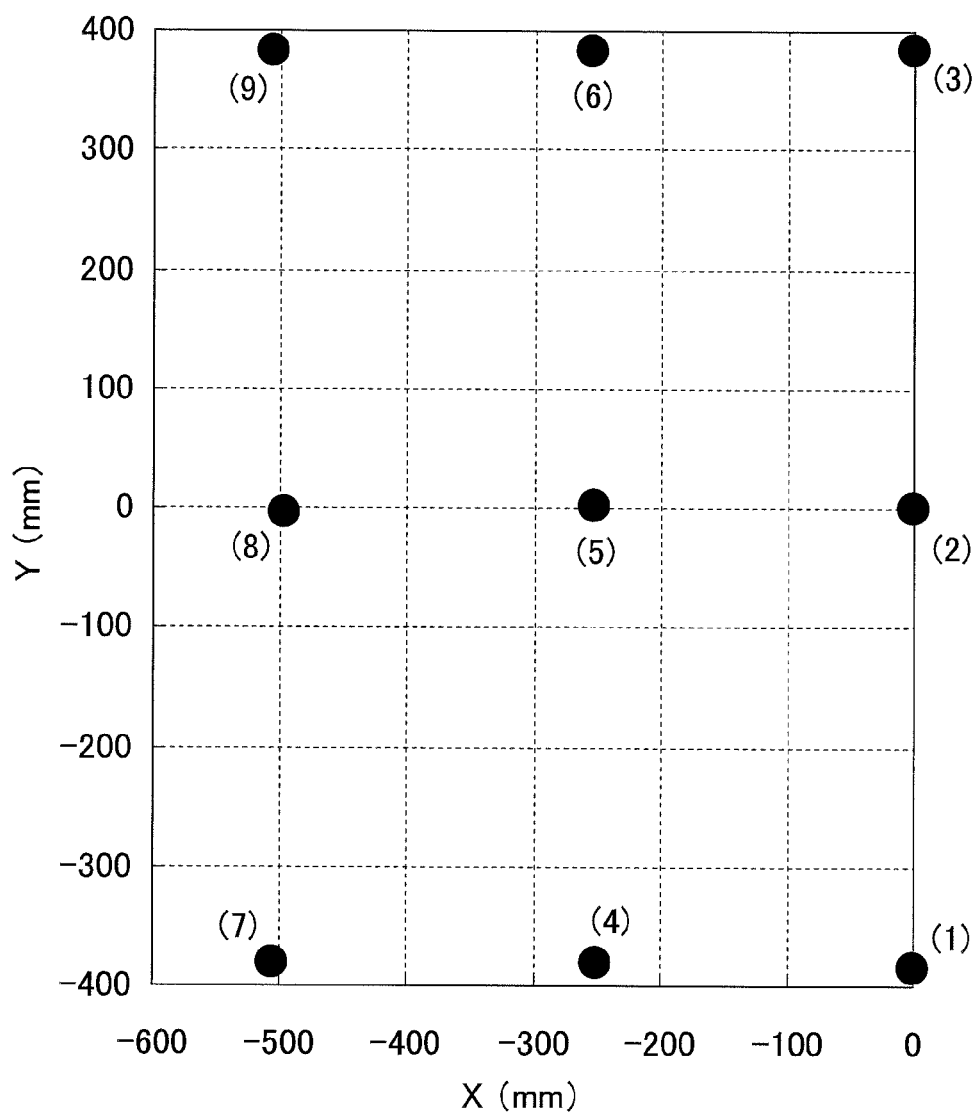
FIG. 10 is a diagram illustrating the positions of image points on a screen (conjugate surface B) corresponding to lattice points of FIG. 9.

FIG. 10 is a diagram illustrating the positions of image points on the screen (the conjugate surface B) corresponding to the lattice points (1)-(9) of FIG. 9, and illustrating the distorted condition of the screen. It can be confirmed that the configuration of the lattice points on the image forming element (the conjugate surface A) illustrated in FIG. 9 is substantially maintained on the screen (the conjugate surface B) illustrated in FIG. 10, and the distortion of the screen is minimized.

Figure 11:
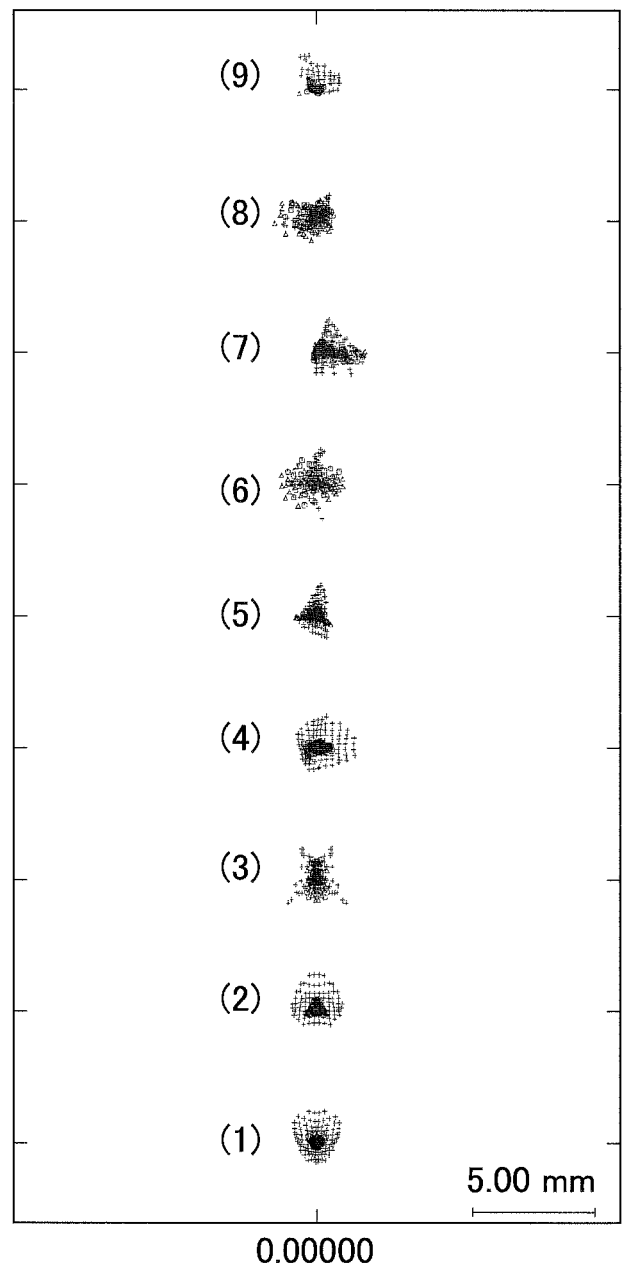
FIG. 11 is a diagram illustrating an example of a spot diagram on a screen (conjugate surface B).

FIG. 11 is a diagram illustrating an example of a spot diagram on the screen (the conjugate surface B). The number of each of the spots (1)-(9) illustrated in FIG. 11 corresponds to the number of the lattice points (1)-(9) illustrated in FIG. 9 respectively. As illustrated in FIG. 11, it can be confirmed that each of the spots is formed with a sufficiently small size, and it is possible to provide an image with good resolution formed on the screen 90.

According to the present disclosure, it is possible to provide an image projection device which allows slimming of the housing of the image projection device and is capable of project an image without embedding the projection optical system in a wall.

The present disclosure is not limited to the specifically disclosed embodiments, and variations and modifications may be made without departing from the scope of the present disclosure.

The present application is based upon and claims the benefit of priority of the prior Japanese patent application No. 2010-163659, filed on Jul. 21, 2010, the contents of which are incorporated herein by reference in their entirety.

What is claimed is:

1. A projection optical system which is arranged to cause a number of light beams output from an image forming element on a first conjugate surface to slantingly enter a second conjugate surface and project an enlarged image of an image formed by the image forming element, on the second conjugate surface, the projection optical system comprising:
a first optical system disposed on a first optical path between the image forming element and the second conjugate surface and including a refracting optical system;
a second optical system disposed on the first optical path at a downstream position of the first optical system and including a reflection surface having a positive power; and
first and second reflection mirrors disposed in this order on a second optical path between the image forming element and the reflection surface to reflect the light beams along the second optical path,
wherein the first and second reflection mirrors are arranged so that a direction of an optical path of the light beams from the second reflection mirror to the reflection surface contains a component of a direction that is opposite to a predetermined direction from the image forming element to the first optical system, and a projection image of the image forming element on the second conjugate surface, a projection of the reflection surface onto the second conjugate surface, and a projection of the image forming element onto the second conjugate surface are arrayed in this order on the second conjugate surface.

2. The projection optical system according to claim 1, wherein at least one of the first reflection mirror and the second reflection mirror is disposed on an optical path between the image forming element and a lens having a largest negative power included in the first optical system.

3. The projection optical system according to claim 1, wherein the image forming element is formed of a micro mirror device and arranged to form a non-telecentric optical system.

4. The projection optical system according to claim 1, wherein an optical surface of the first optical system disposed at a position nearest to an aperture stop has an aspherical surface configuration.

5. The projection optical system according to claim 1, wherein an optical surface of the first optical system disposed at a position nearest to the reflection surface has an aspherical surface configuration.

6. The projection optical system according to claim 1, wherein the reflection surface has a free-form surface configuration.

7. An image projection device comprising:
the projection optical system according to claim 1;
a light source to emit an illuminating light; and
the image forming element to form an image by the illuminating light in accordance with a modulating signal,
wherein the image projection device is arranged to supply the illuminating light emitted by the light source to the image forming element, and project an enlarged image of an image formed by the image forming element onto a screen by using the projection optical system.

8. The image projection device according to claim 7, wherein at least one of the second optical system and the second reflection mirror is arranged to fully or partially protrude from a housing of the image projection device when the image projection device is in use, and the at least one of the second optical system and the second reflection mirror is arranged to be movable so that the at least one of the second optical system and the second reflection mirror is accommodated in the housing when the image projection device is not in use.

9. The image projection device according to claim 8, wherein at least one of the second optical system and the second reflection mirror is arranged to be rotatable around a predetermined shaft.

10. The image projection device according to claim 8, wherein at least one of the second optical system and the second reflection mirror is arranged to be movable in a direction of a thickness of the housing.

* * * * *